(No Model.)
C. E. W. WOODWARD.
PNEUMATIC BICYCLE TIRE.
No. 531,822. Patented Jan. 1, 1895.
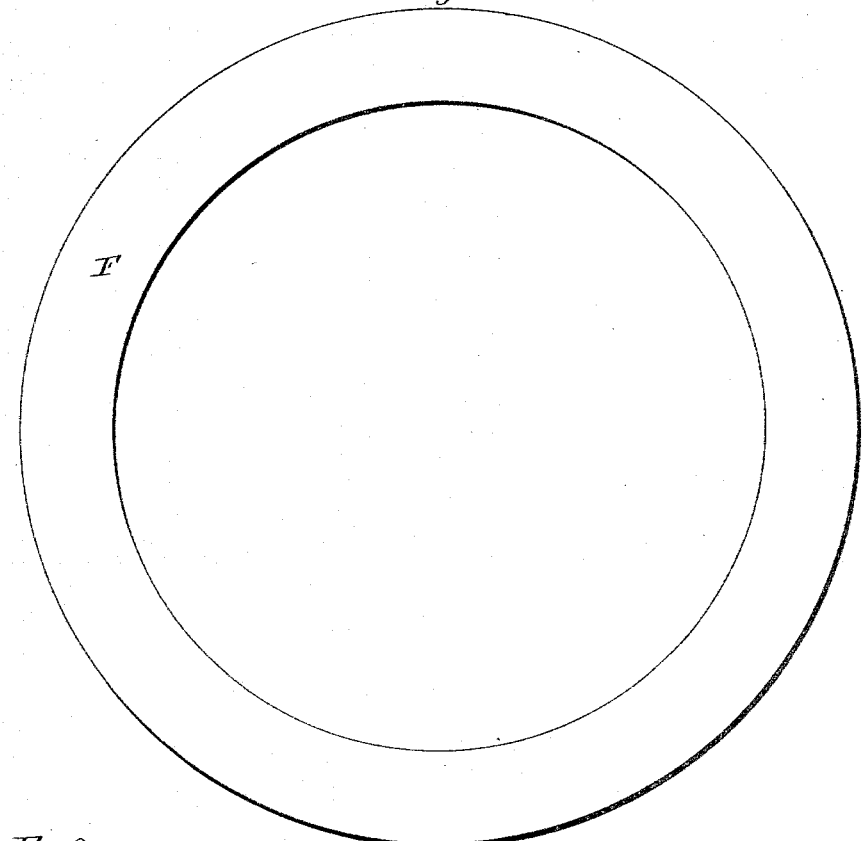
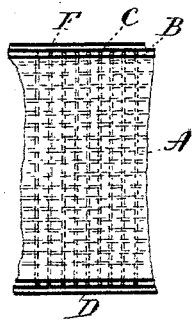
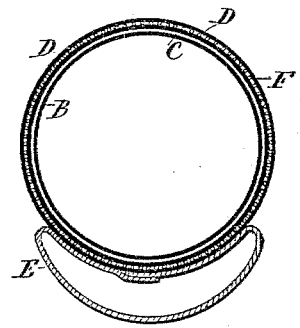

UNITED STATES PATENT OFFICE.

CHARLES E. W. WOODWARD, OF CHICOPEE FALLS, MASSACHUSETTS, ASSIGNOR TO THE OVERMAN WHEEL COMPANY, OF SAME PLACE AND HARTFORD, CONNECTICUT.

PNEUMATIC BICYCLE-TIRE.

SPECIFICATION forming part of Letters Patent No. 531,822, dated January 1, 1895.

Application filed April 13, 1894. Serial No. 507,490. (No model.)

*To all whom it may concern:*

Be it known that I, CHARLES E. W. WOODWARD, of Chicopee Falls, in the county of Hampden and State of Massachusetts, have invented a new Improvement in Pneumatic Bicycle-Tires; and I do hereby declare the following, when taken in connection with accompanying drawings and the letters of reference marked thereon, to be a full, clear, and exact description of the same, and which said drawings constitute part of this specification, and represent, in—

Figure 1, a view in side elevation of a tire constructed in accordance with my invention; Fig. 2, a view in side elevation of a section of such a tire showing particularly the arrangement of its transverse and longitudinal threads; Fig. 3, a view of the tire in transverse section.

My invention relates to an improvement in pneumatic cycle tires, the particular objects being to produce a tire superior in lightness, strength, resilience, tractional power, and responsiveness to tires of the same class as heretofore constructed, and requiring less material than has heretofore been necessary.

With these ends in view, my invention consists in a thread tire having unwoven longitudinal threads laid straightaway, and regularly graded in length from the center of its outer periphery inward.

My invention further consists in a tire having threads arranged to resist distention by internal pressure, and unwoven longitudinal threads laid straightaway and regularly graded in length from the center of its outer periphery inward.

My invention further consists in a tire having certain details of construction and combinations of parts as will be hereinafter described and pointed out in the claims.

Before proceeding to describe the construction and operation of my improved tire, it may be well for me to state by way of preface, that I conceive that the lines of greatest tension set up by the expansive force of the air confined in a tire, are two in number; namely: lines lying in planes standing at a right angle to it, and lines lying in planes parallel to it. The tension within the tire will, therefore, be most completely met by threads coincident with the said planes, which is to say, threads arranged transversely and longitudinally to the tire, and laid straightaway, so that all of them will be brought to the same tension at the same time, whereby the tension will be evenly distributed throughout the tire. It is apparent that by locating the threads in lines coincident with the lines of the greatest strain, they will be used, theoretically, to the highest advantage. If all the thread that enters into the tire is used to the highest advantage, it follows that the amount used is reduced to the minimum, and lightness and resilience secured without loss of strength and durability, all of which will more fully appear later on.

It may not be necessary in practice to follow strictly the theory above set forth, because I may depart from it somewhat, and still produce a tire of a high degree of excellence, but by preference I shall follow it as closely as may be.

My improved tire may be constructed in several different ways, but it will not be necessary to describe more than one way of making it, herein. That consists in winding a thread A—I shall call it the transverse thread—straightaway upon a light rubber tube B, in a long spiral of such fine pitch that its individual coils which are side by side will stand at substantially a right angle, or transversely to the plane of the tube, which may be a straight tube, or and endless tube of the diameter required. By the term "straightaway," which I shall frequently use in this description, I wish to be understood as meaning the laying of a thread in a direct line, which may conform, however, to the longitudinal or lateral curvature of the tire, but which excludes secondary bends or turns forming slack which must be taken up before the thread can be put under effective tension. The bends or turns imposed upon a thread by interweaving it with another thread, are within the meaning of the above description, and form slack which must be taken up before the threads can be placed under tension. I do not wish to be understood, however, as broadly claiming a tube having threads laid straightaway or unwoven, for the winding of threads upon tubes has long been practiced, and even applied to the construction of cycle tires. The individual coils of the said transverse thread may be wound so as to be in contact with each other, or not, as desired. Over them I place a thin sheet of rubber C, or equivalent material, and upon the same I apply an unwoven thread D—I shall call it the longitudinal thread—which is laid on straightaway in coils, at a right angle, or substantially a right angle to the transverse coils of the thread A. These coils of the longitudinal thread may be laid on in contact with each other or not, as desired. By preference the longitudinal thread is applied by an automatic machine in which the partly developed tire is located. The coils of the transverse thread exactly correspond to each other in diameter, but those of the longitudinal thread will be regularly graded in diameter according to their several positions on the surface of the tire, the largest coil being in the center of the outer periphery of the tire, and the coils growing gradually smaller from that point inward. If they are continued to the center of the inner periphery of the tire, the coil at that point will be the smallest in diameter of all. I believe, however, it will be unnecessary to continue these coils inward beyond the edges of the wheel-rim E, although, as shown in the drawings, they are continued inward so as to completely encircle the tire. If the longitudinal coils are considered as being independent of each other and each consisting of a single thread, the threads of the several coils would be regularly graded in length, and grow gradually shorter from the center of the outer periphery of the tire inward. Over the coils of the longitudinal thread I apply an envelope F, of rubber, or other equivalent material, which protects them, and binds them together. By preference the transverse coils will be formed, as described, from a single piece of thread, long enough to be wound transversely around the inner tube B, so as to completely cover the same; but in adapting the tire to be applied to the wheel rim E, it will not matter if those portions of the transverse coils included between the edges of the rim, are in part removed, so long as they extend within the edges of the rim, and are there secured. By cutting portions of the transverse coils away, as set forth, their serial continuity is destroyed, and they become in effect independent isolated segmental threads, which are not materially less effective, however, on that account. It follows from this that I may, if desired, employ in the initial construction of the tire, a series of short transverse threads, laid side by side, instead of one long transverse thread adapted in length to be wound continuously around the tire. In the construction suggested, it will be understood, of course, that the short threads would be long enough to extend within the edges of the wheel-rim. By preference, also, the longitudinal coils will be formed as described, from a single piece of thread, long enough to be wound longitudinally around the entire tire, or so much thereof as is exposed outside of the edges of the rim, but if desired, an independent thread may be employed for each longitudinal coil. I may say here, that that portion of the tire confined by the wheel rim may be combined with cloth, wire, hard rubber, or any other material required, in the adaptation of the tire to be mechanically fastened to the rim.

I particularly wish to call attention to the fact that by applying the two sets of threads in planes transverse and longitudinal to the tire, they are located in lines coincident with the lines of the greatest tension imposed upon the same by the confined compressed air, and are therefore placed so as to be most effective in resisting such tension. Such certainly is the ideal way of utilizing the threads, and secures the highest degree of strength with the use of a given amount of material, for no material is employed which is not active in resisting strain. The arrangement of threads described brings all of the threads to the same tension at the same time, so that the expansive force represented by the confined compressed air, will be distributed evenly throughout the entire tire. It is clear that if no excess of material is employed, the resulting tire will be relatively light and responsive, for at the best the tire interferes with the perfect cushioning action of the air. I also wish to call attention to the fact that by applying the transverse thread and the longitudinal thread straight away and without any of those secondary turns or bendings incident to weaving threads, there is no slack in the coils to be taken up, so that when the tire is subjected to internal pressure, all of the coils or threads will be brought to the same tension at the same time, and prevent it from being laterally enlarged or distended, and also longitudinally enlarged or extended. The two sets of coils or threads therefore act together to maintain the tire in its initial form and prevent its capacity from being increased by any degree of internal pressure to which it may be subjected in any ordinary usage of it. In the completed tire both the transverse threads and the longitudinal coils or threads normally have the positions into which the expanding action of the confined air tends to force them. In other words, the initial or non-inflated shape of the tire corresponds exactly to its fully inflated shape. The capacity of the tire therefore is a constant quality as regards internal pressure, although obviously it may be reduced in capacity under outward pressure causing local inward displacement. Furthermore, the tractional power and responsiveness of the tire is much improved by laying the threads, and particularly the longitudinal threads, straightaway, inasmuch as the power communicated to the periphery of the tire by the rider of the machine is then applied immediately, whereas with woven tires there is a loss of time and power between the exertion of the power and its conversion into motion, represented by the time and effort required to straighten out the secondary bends or turns in the threads due to weaving. On this account my improved tire is much more responsive in use to the exertion expended by the rider than woven tires in which an interval must elapse between the exertion of the power and the conversion thereof into motion. Again, by applying the threads straightaway the tire is made much more flexible under the action of the compressed air which it confines, than when the threads are woven, for the interweaving of the threads so far increases the intimacy of their relations that they support each other and resist flexure to a much greater extent than they do when they are simply laid side by side and across each other, and so that each thread is independent of its neighbor, and not restrained thereby except in a general organic way. The threads are all bound together by rubber, which makes the tire air-tight, and by preference they are also saturated with a solution thereof to indurate them and protect them from the abrasive action of wear. I do not, however, aim to derive any direct cushioning action from the rubber itself. On the other hand, I do aim to place the least obstruction in the way of the cushioning action of the air confined within the tire. By arranging one set of threads transversely to the tire, and the other set longitudinally thereto, I secure a further advantage which I may best illustrate by reference to prior constructions, in which the threads are arranged diagonally. It will be understood that under such an arrangement of the threads, the internal pressure upon them will tend to re-arrange them and develop tension within the composite fabric or envelope itself. Indeed, the displacement of the threads of some prior tires has been relied upon to constrict the tires and thus hold them in place upon the wheel-rims; but when the tire in itself is in a state of internal tension, that tension must be overcome at the expense of some of the units of power represented by the weight of the machine and the rider, and the force of the impact of the tire upon the road-bed. I conceive therefore that a tire in which there is internal tension is handicapped to the degree thereof. On the other hand it will be apparent that when the threads composing the tire are arranged transversely and longitudinally, as under my invention, the compressed air confined within the tire obtains no leverage upon the threads, and cannot displace them, or force them into positions in which they develop internal tension within the fabric itself. It will therefore be perceived that the fabric of my improved tire is passive, as distinguished from the tires of prior construction, which I have just been describing. The advantage of my construction in this respect is obvious.

When a tire constructed in accordance with my invention is in use, there will be, first, a progressive inward displacement of that portion of the tire in contact with the road, whereby the capacity of the air-chamber of the tire is virtually reduced, and the air in the said chamber further condensed, and increased in effective value, and second, a practically instantaneous progressive reaction or recovery of the displaced portion of the tire, whereby the increased tension of the confined air is utilized to propel the wheel. The additional condensation of the air and hence the increase in pressure within the tire, is in direct relation to the weight of the machine and rider, and to the force of the impact of the tire upon the road bed.

My improved tire yields inwardly to outward or road pressure, and yields correspondingly outward to the resiliency of the air affected by such pressure, and as the wall of the tire is inelastic, or non-distensible and non-extensible, and does not as a whole yield outwardly under the increased air pressure produced by the impact upon the road bed, as tires heretofore constructed do, the full amount of compression is obtained, and the area or amount of displacement of the wall under such impact is consequently lessened, and the reaction being more of air under tension than of the tire, which is comparatively inert, is therefore quicker, and more efficient.

In a wheel traveling at a high rate of speed, the efficiency of the tire is directly related to the quickness of its reaction, as in order to give back the propulsive force or momentum lost in displacing the wall of the tire inwardly, the reaction must be against some resisting medium such as the road-bed, that is to say, in order to get full reaction, no movement should take place in the tire after it has rolled clear of the ground, but on the other hand, the reaction should take place before that portion of the tire affected by it leaves the ground. It will thus be seen that to give any effective push against the road-bed in the extremely brief contact between any portion of the tire and the road, the reaction or recovery of the displaced portion of the tire must be almost instantaneous, and that result is just what I obtain. By making the tire non-distensible and also non-extensible, I therefore secure important results in its action, for when the tire is indented by the weight of the machine and the rider, and by the force of the impact of the tire with the ground, the air confined within the tire is proportionally compressed and increased in effective value.

From the stand-point of my invention, the true object of pneumatic tire construction is to confine a body of compressed air in an inelastic perfectly flexible envelope of such character as to give fullest play to the action of the air. In other words, I wish to suppress the tire itself as far as possible, and rely upon confined compressed air for cushioning effect. From the point of my invention, an ideal tire would be an impalpable, non-elastic, perfectly flexible envelope strong enough to confine a body of compressed air under any degree of tension developed in the use of the tire. In that ideal construction the tire itself would be a completely passive instrument for the confinement and play of the air, which would form the active element of the tire. On the other hand, elastic tires will be distended and extended by indentation, and the units of power represented thereby will be largely thrown away, because they will be exerted generally throughout the entire tire in expanding the same, instead of being exerted locally, or at the point of indentation, for pushing the indented portion of the tire back into its normal place. When therefore, the tire is non-elastic, as it becomes when made in accordance with my invention, all of the units of power represented by the weight of the machine and the rider, and the impact of the tire upon the ground, are utilized in increasing the pressure of the air confined within the tire, and that increased pressure expends itself at once in promoting the reaction of the tire or its recovery after indentation, and thus in the actual propulsion of the wheel, for the tire being non-distensible and non-extensible, its indentation at one point is immediately followed by the compression of all of the air in it, and the air seeks to expand and recover its normal pressure at the point of least resistance, which will be when the tire is in motion, at that point directly in rear of the point in contact with the ground. In my improved tire, therefore, there will be a progressive lifting of the wheel, tending to urge it forward, due to the strictly localized action of the compressed air confined within the tire.

The tire shown and described has its transverse threads located within its longitudinal threads, but if desired that arrangement may be reversed, for the relationship or connection between the two sets of threads is so close on account of their incorporation into the same structure by means of cement and rubber, that what acts upon one set of threads acts upon the other. Furthermore, the position of the threads in one set in relation to each other, is in part fixed by the threads in the other set, and vice-versa. Thus any force acting transversely to the length of the transverse threads is restrained from displacing them to any appreciable extent, by the longitudinal threads, which do not yield in that direction, and which are so closely connected organically with the transverse threads that they hold them in position. In the same manner any force exerted transversely to the longitudinal threads tending to displace them, will be resisted by the transverse threads which do not yield in that direction, and which are so closely connected with the longitudinal threads that they will hold them against displacement. Obviously it is immaterial so far as resistance to the two lines already specified of greatest tension is concerned, whether the transverse threads are on the inside and the longitudinal threads on the outside, or vice-versa. Theoretically it might appear that the tractional power of the tire might be better with the longitudinal threads arranged on the outside, but experiment demonstrates that the relations of the two sets of threads are so close that when the longitudinal threads are arranged on the inside, the tire retains most, if not all of its tractional power.

I do not limit myself to any particular way of producing my improved tire, which may be done in other ways than mentioned, and either on the principle of building up the tire on an air, fluid, or solid core or form.

Preferably I shall in the construction of my improved tire employ a set of transverse threads or coils, and a set of longitudinal threads or coils, such a construction producing the best results; but as I stated at the outset of my description, it may not be necessary in practice to follow strictly the theory of my invention, for I may depart from it somewhat, and still produce a tire of a high degree of excellence. I conceive that the employment of longitudinal threads or coils laid straightaway and graded in length, as set forth is essential, but I also conceive that the other threads or coils might be arranged otherwise than transversely, as for instance, diagonally. Thus two sets of diagonal threads wound in opposition to each other might be employed, or the transverse threads might be replaced by a woven tube used in conjunction with longitudinal threads laid on straightaway and graded in length.

I would therefore have it understood that I do not limit myself to the exact construction herein shown and described, but hold myself at liberty to make such changes and alterations therein as fairly fall within the spirit and scope of my invention.

I am aware, however, that unwoven longitudinal and transverse threads are old in hose-pipes, and am also aware that a tire having woven longitudinal threads graduated in length according to their place upon its periphery is old.

I am further aware that a bicycle tire having unwoven, ungraded longitudinal threads, is old.

I do not therefore broadly claim unwoven longitudinal and transverse threads, nor a bicycle tire having unwoven, ungraded longitudinal threads, nor graduated longitudinal threads.

Having fully described my invention, what I claim as new, and desire to secure by Letters Patent, is—

1. A jointless tire having circularly disposed unwoven longitudinal threads laid straightaway, and regularly graded in length from the center of its outer periphery inward, and resisting extension by internal pressure, substantially as described.

2. A tire having unwoven threads laid straightaway and arranged to resist distension by internal pressure, and unwoven longitudinal threads laid straightaway and regularly graded in length from the center of its outer periphery inward, substantially as described.

3. A tire having unwoven threads laid straightaway and arranged transversely or substantially transversely to it, and resisting the distension of the tire by internal pressure, and unwoven longitudinal threads laid straightaway at a right angle or substantially a right angle to the transverse threads, and regularly graded in length from the center of the outer periphery of the tire inward, the said transverse and longitudinal threads being combined with rubber or equivalent material, substantially as described.

4. A tire comprising an inner tube of rubber, a series of unwoven transverse threads applied straightaway side by side to the outer surface of the said tube at a right angle or substantially a right angle thereto, a layer of rubber applied to the outer surface of the said transverse threads, a series of unwoven threads laid straightaway side by side upon the outer surface of the said layer of rubber, arranged at a right angle or substantially a right angle to the said transverse threads, and graded in length from the center of the outer periphery of the tire inward, and a layer of rubber applied over the said longitudinal threads, substantially as set forth.

5. The combination with a wheel-rim, of a thread tire attached thereto, having unwoven threads laid straightaway transversely to the tire, and extending within the edges of the rim, and unwoven longitudinal threads laid straightaway and regularly graded in length from the center of the outer periphery of the tire inward to the edges of the rim, substantially as set forth.

In testimony whereof I have signed this specification in the presence of two subscribing witnesses.

CHARLES E. W. WOODWARD.

Witnesses:
 EDWARD S. WHITE,
 WILLIAM S. L. HAWKINS.